United States Patent [19]

Rojdev et al.

[11] Patent Number: 5,093,968
[45] Date of Patent: Mar. 10, 1992

[54] GASKET AND ONE-WAY VALVE FOR A CASKET

[75] Inventors: Ilija Rojdev, Cincinnati, Ohio; Walter Hullemeyer, Batesville, Ind.

[73] Assignee: Batesville Casket Company, Inc., Batesville, Ind.

[21] Appl. No.: 591,142

[22] Filed: Oct. 1, 1990

[51] Int. Cl.⁵ .............................................. A01N 1/00
[52] U.S. Cl. ........................................... 27/17; 49/478
[58] Field of Search .................... 27/17, 2, 3, 6, 14, 27/16; 403/DIG. 1; 49/478; 52/403, 397

[56] References Cited

U.S. PATENT DOCUMENTS

| | | |
|---|---|---|
| 2,271,777 | 2/1942 | Nathan . |
| 2,533,827 | 12/1950 | McEwan . |
| 2,533,828 | 12/1950 | McEwan . |
| 2,945,717 | 7/1960 | Trice . |
| 3,065,517 | 11/1962 | Dower . |
| 3,327,429 | 6/1967 | Slaughter . |
| 3,461,517 | 8/1969 | Eisenhard ........................ 27/17 |
| 3,892,417 | 7/1975 | Clayton . |
| 3,981,054 | 9/1976 | Hull et al. . |
| 4,555,119 | 11/1985 | Semon . |
| 4,868,957 | 9/1989 | Rojdev . |
| 4,882,821 | 11/1989 | Sims, Jr. ........................... 27/17 |

Primary Examiner—Richard E. Chilcot, Jr.
Attorney, Agent, or Firm—Wood, Herron & Evans

[57] ABSTRACT

A gasket for a casket is an endless integral rubber element that extends around the perimeter of the casket and seals the lid to the shell. The gasket has a wide base and at its outer edge an upwardly-projecting ridge which is approximately triangular in cross section. The outer surface of the ridge is concave to promote the flexing of the ridge outwardly when the lid is closed upon the shell. The tip of the ridge and the underside of the gasket have continuous ribs that form the seals to the lid and shell, respectively.

5 Claims, 1 Drawing Sheet

GASKET AND ONE-WAY VALVE FOR A CASKET

BACKGROUND OF THE INVENTION

This invention relates to a gasket for sealing a casket.

A casket has a bottom shell whose upper edge around its perimeter is formed as a horizontal flange, the flange having an upwardly-facing surface. A lid has a perimeter rim that terminates in a flange with a downwardly-facing surface. A gasket must be provided between the two surfaces to seal a body within the casket against the incursion of rain water and the like.

The gasket perimeter is quite large and may measure as much as 87"×29". A shell and lid, formed from sheet metal, of those dimensions cannot be held to fine tolerances. There are, therefore, large dimensional differences in the space between the facing shell and lid flanges as the lid is tightened against the shell. Rubber forming the gasket between the two flanges can be compressed to a maximum of 40% reduction in thickness. Thereafter, any continued attempt to compress the rubber causes the bending of the metal flanges.

SUMMARY OF THE INVENTION

An objective of the present invention has been to provide a gasket that provides an excellent seal while accommodating dimensional differences between the upper and lower flanges that normally would require more than a 40% reduction in the thickness of the rubber gasket.

Another objective of the present invention has been to provide for sealing across minor imperfections of the flanges.

Still another objective of the present invention has been to configurate the gasket to provide a one-way valve around the perimeter of the casket which permits the escape of gases emanating from the body after burial.

These objectives of the invention are attained by providing a gasket that is compressionmolded into a single endless element that forms the complete seal around the perimeter of the casket. A gasket has a flat base that lies upon the shell flange. At the outer edge of that flat base a ridge projects upwardly, the ridge being approximately triangular in cross section. The outer surface of that ridge is concave. An upper small rib extends along the top of the ridge and a lower small rib extends along the base immediately below the upper rib.

The small ribs form the actual seal and conform to the respective flange surfaces with their inconsistent flatness, minor weld imperfections, spot weld marks and the like. The ridge, with its concave outer surface, will flex outwardly when the lid is applied under pressure to the shell to close and seal the casket. The outward flexing provides two important functions. First, it permits the upper flange to squeeze down toward the lower flange a distance greater than the 40% compression of rubber. Such large movement of the lid flange surface toward the shell flange surface is permitted without deforming the flanges because the ridge portion of the gasket flexes outwardly rather than compresses downwardly, at the same time providing necessary upward force to create a seal. The rib compresses against the surface of the lid to form a seal there just as the rib at the bottom of the base compresses against the shell flange to form a seal there.

The second function provided by the concavity is the creation of a one-way valve between the upper flange and the lower flange, the one-way valve being formed by the outward flexing of the ridge. Thus, the ridge and rib seal prevent water from entering into the casket still permitting the escape of the gases from the inside to the outside of the casket.

BRIEF DESCRIPTION OF THE DRAWINGS

The several features and objectives of the present invention will become more readily apparent from the detailed description taken in conjunction with the accompanying drawings in which.

DETAILED DESCRIPTION OF THE INVENTION

Figure 1:
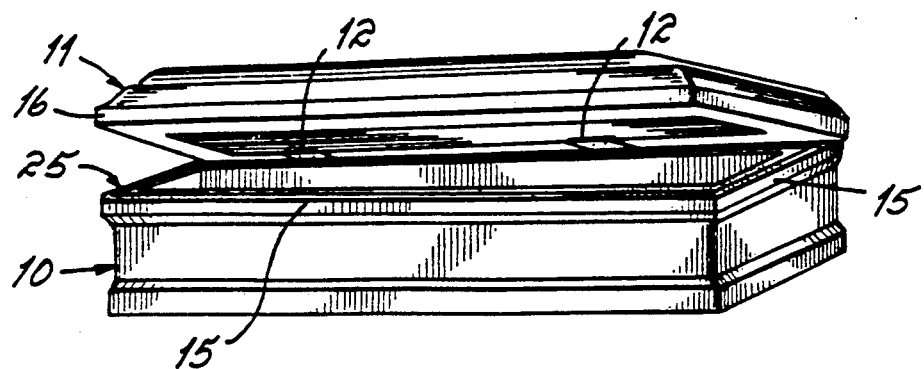
FIG. 1 is a perspective view of a casket utilizing the present invention.

Referring to FIG. 1, there is shown a casket shell 10 and a lid 11 hinged at 12 to the shell. The lid and shell are provided with a mechanism, not shown but old and well known, for tightening the lid 11 against the shell 10 all around the perimeter of the casket and lid. The shell has a perimeter 15 shown in detail in FIGS. 2 and 3. The lid has a perimeter 16 shown in detail in FIGS. 2 and 3. The shell perimeter has an inwardly-directed flange 18 presenting an upper surface 19. The perimeter of lid 11 has an inwardly-directed flange 20 having a downwardly-facing surface 21. A gasket 24 is provided to form a seal between the upwardly-facing surface 19 and the downwardly-facing surface 21.

Figure 4:
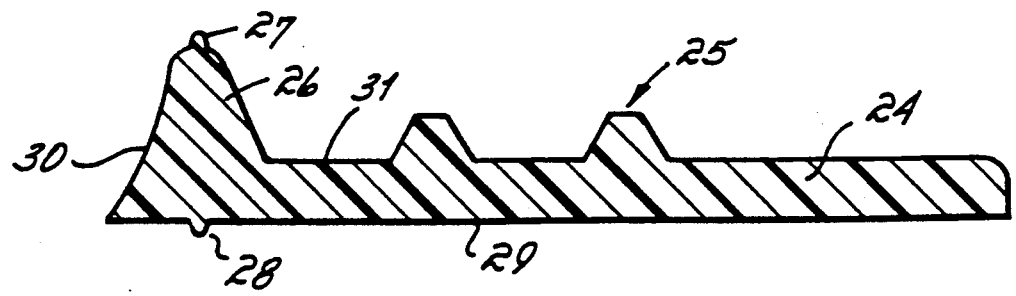
FIG. 4 is an enlarged cross-sectional view of the gasket.

As best shown in FIG. 4, the gasket is an integral rubber element which is compression-molded as one endless piece in order to avoid any interruption of the gasket around the perimeter of the casket. The rubber preferably is of a durometer of about 25–28 to be very soft, providing minimum resistance to compression while still avoiding tackiness. The gasket has a wide (about 2 inches) base 25 that lies on lower flange 18 and extends continuously around the perimeter of the shell 10. At the outer edge of the base and extending endlessly around the gasket is a ridge 26 which is generally of triangular configuration. The ridge 26 has a rib 27 at its apex. A similar rib 28 is formed on the bottom surface 29 of the base 25. The ridge has an outer surface 30 that is concave. The radius of the concavity is approximately 0.800". The ridge 26 is about 0.400" high above the upper surface 31 of the base 25. The ribs 27 and 28 are about 0.032" high from base 25 and apex of ridge 26.

Figure 2:
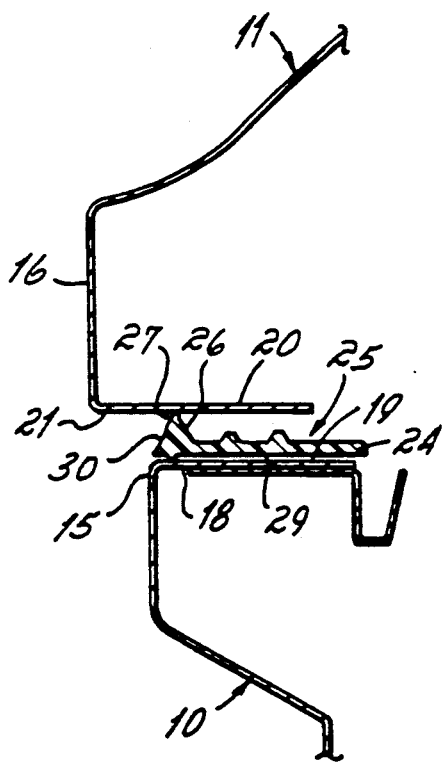
FIG. 2 is a fragmentary cross-sectional view of the lid and shell flanges with a gasket in an unstressed state.
Figure 3:
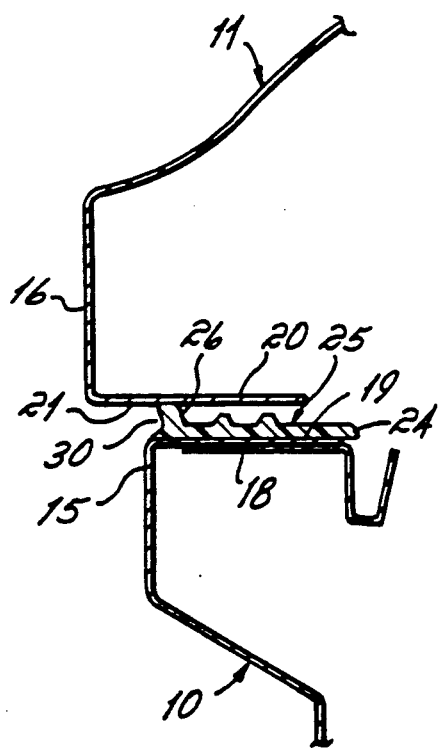
FIG. 3 is a view similar to FIG. 2 with the gasket in a stressed state.

In operation, the gasket is placed upon the upper surface 19 of the shell flange and secured there by adhesive. In the unstressed state, the gasket appears as shown in FIG. 2. When the lid downwardly-facing surface 21 presses against the gasket during the closing and sealing of the casket, the upper and lower ribs 27 and 28 will be compressed. They will fill in all of the surface imperfections of the two flanges. Continued squeezing down of the lid causes the ridge 26 to flex outwardly, as shown in FIG. 3, the outward flexing of the rib being promoted by the radiused concave surface 30. This flexing will be greater in some portions of the perimeter of the casket and lesser in other portions of the perimeter of the casket, depending upon the spacing of the two surfaces 19 and 21 away from each other in the closed condition. The outward flexing and compression of rubber will continue until a complete seal is formed all around the casket perimeter.

Thus it is that the ridge 26 accommodates the varying distances between the upper and lower flange surfaces without overcompressing the rubber and distorting the metal in the flanges. Simultaneously, the small ribs 27, 28 provide the actual seal by conforming to the surface inconsistencies on both the upper and lower flanges.

Around the perimeter of the casket, holes will be formed to accommodate pull-down studs and the like by which the lid is tightly drawn down onto the shell. Additionally, pads may be provided to form seals wherein the lid is formed in two pieces. One such seal is depicted in U.S. Pat. No. 4,868,957. In all of these, the configuration of the gasket is altered somewhat to accommodate those needs, but the changes in the gasket all occur inboard of the ridge 26 so that the sealing capability of the ridge and its ribs 27 and 28 remain unaltered.

From the above disclosure of the general principles of the present invention and the preceding detailed description of a preferred embodiment, those skilled in the art will readily comprehend the various modifications to which the present invention is susceptible. Therefore, I desire to be limited only by the scope of the following claims and equivalents thereof:

I claim:

1. An integral rubber casket gasket comprising:
   a flat rubber base adapted to lie on a shell flange,
   an elongated rubber ridge projecting above said base, said ridge being generally triangular in cross section, said ridge having an outwardly-facing surface that is concave to urge said ridge outwardly when the pressure of a lid flange is applied against said rib, thereby enabling said seal to accommodate large dimensional differences in spacing between said shell and lid flanges, respectively, and creating a one-way check valve permitting gas flow only out of said casket.

2. A casket gasket as in claim 1 further comprising:
   a first integral small rib extending along the top of said ridge for sealing engagement with said lid flange,
   and a second integral small rib on the undersurface of said base, said second rib contacting said shell flange.

3. A casket gasket as in claim 2 in which said ribs are about 0.032 inch high.

4. A casket seal as in claim 1 in which said ridge is about 0.400 inch above said base and said outer surface has a radius of concavity of about 0.800 inch.

5. In a casket having a lid with a downwardly-facing flange and a shell with an upwardly-facing flange, an integral gasket forming a seal between flanges comprising:
   a continuous flat base lying on said shell flange and extending around the perimeter of said shell,
   an elongated ridge integral with said base and extending around the perimeter of said shell, said ridge being triangular in cross section and having a concave outwardly-facing surface that promotes said ridge to lean outwardly when said lid flange is pressed against it,
   and upper and lower sealing ribs on said ridge and base, respectively, to provide sealing engagement with one of said gasket with said lid flange and shell flange, respectively.

* * * * *